United States Patent [19]
Kohnke et al.

[11] Patent Number: 5,949,542
[45] Date of Patent: Sep. 7, 1999

[54] METHOD OF TUNING AN OPTICAL DEVICE

[75] Inventors: Glenn E. Kohnke, Painted Post; Kevin B. Sparks, Corning, both of N.Y.

[73] Assignee: Corning, Inc., Corning, N.Y.

[21] Appl. No.: 09/248,249

[22] Filed: Feb. 11, 1999

Related U.S. Application Data

[60] Provisional application No. 60/079,760, Mar. 27, 1998.

[51] Int. Cl.⁶ ..................................................... G01B 9/02
[52] U.S. Cl. .............................. 356/345; 356/346; 385/12
[58] Field of Search ..................................... 356/345, 346, 356/352; 365/12

[56] References Cited

U.S. PATENT DOCUMENTS 5,062,684  11/1991  Clayton et al. .......................... 356/352

*Primary Examiner*—Robert H. Kim
*Attorney, Agent, or Firm*—William J. Chervenak

[57] ABSTRACT

Disclosed is a tuning method for optical interference devices which comprise at least one plurality of waveguides arranged to produce a preselected phase shift in light transmitted therethrough. The tuning is carried out by irradiating the plurality of waveguides using a source of UV light. The method is faster and more reproducible than other tuning methods known in the art, such as tuning by heat induced dopant diffusion. The method is exemplified by data taken using a Mach-Zehnder interferometer. However, the method is compatible with more sophisticated devices which use integrated waveguides or large numbers of waveguides in the phase changing portion of the device.

13 Claims, 3 Drawing Sheets

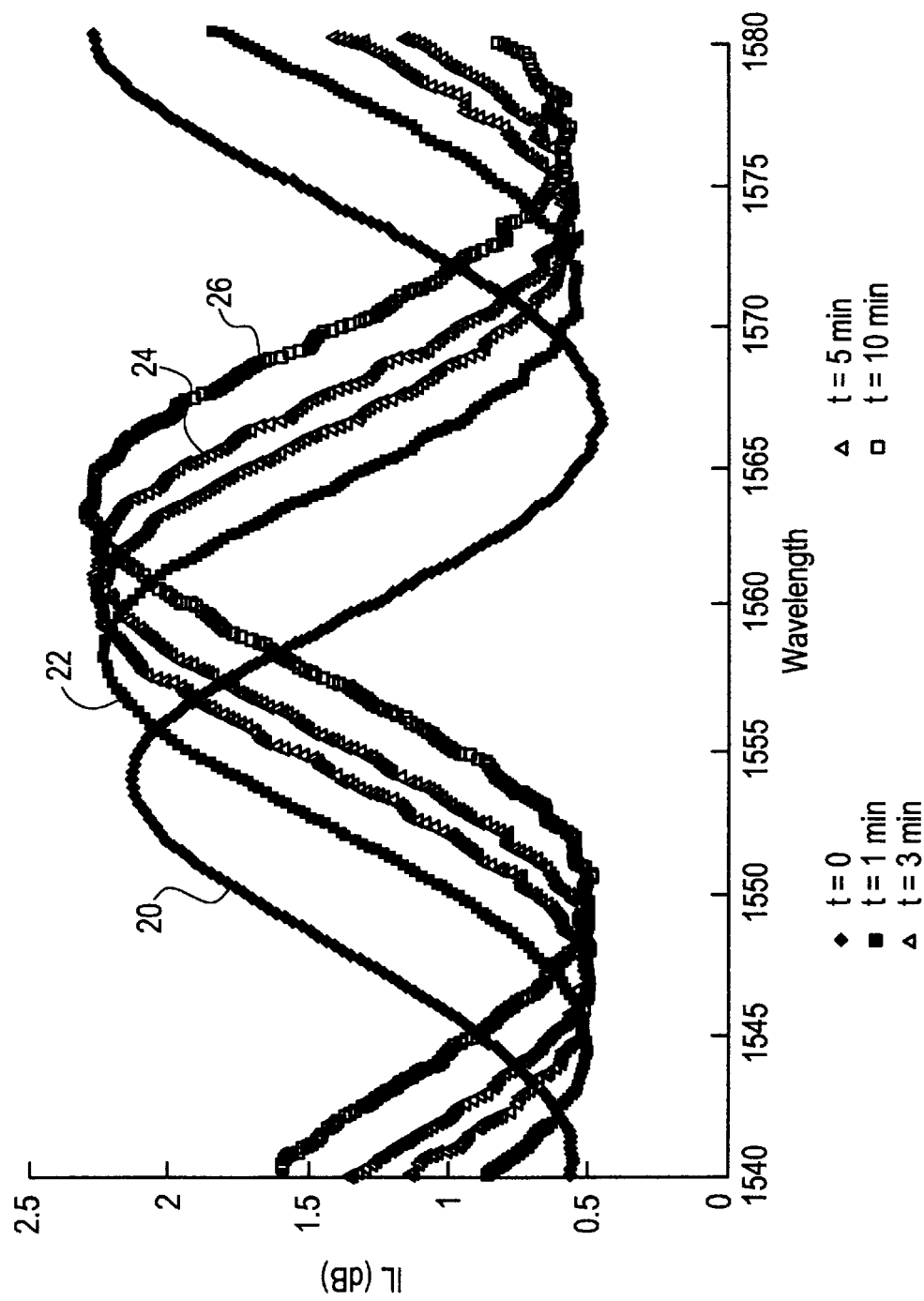

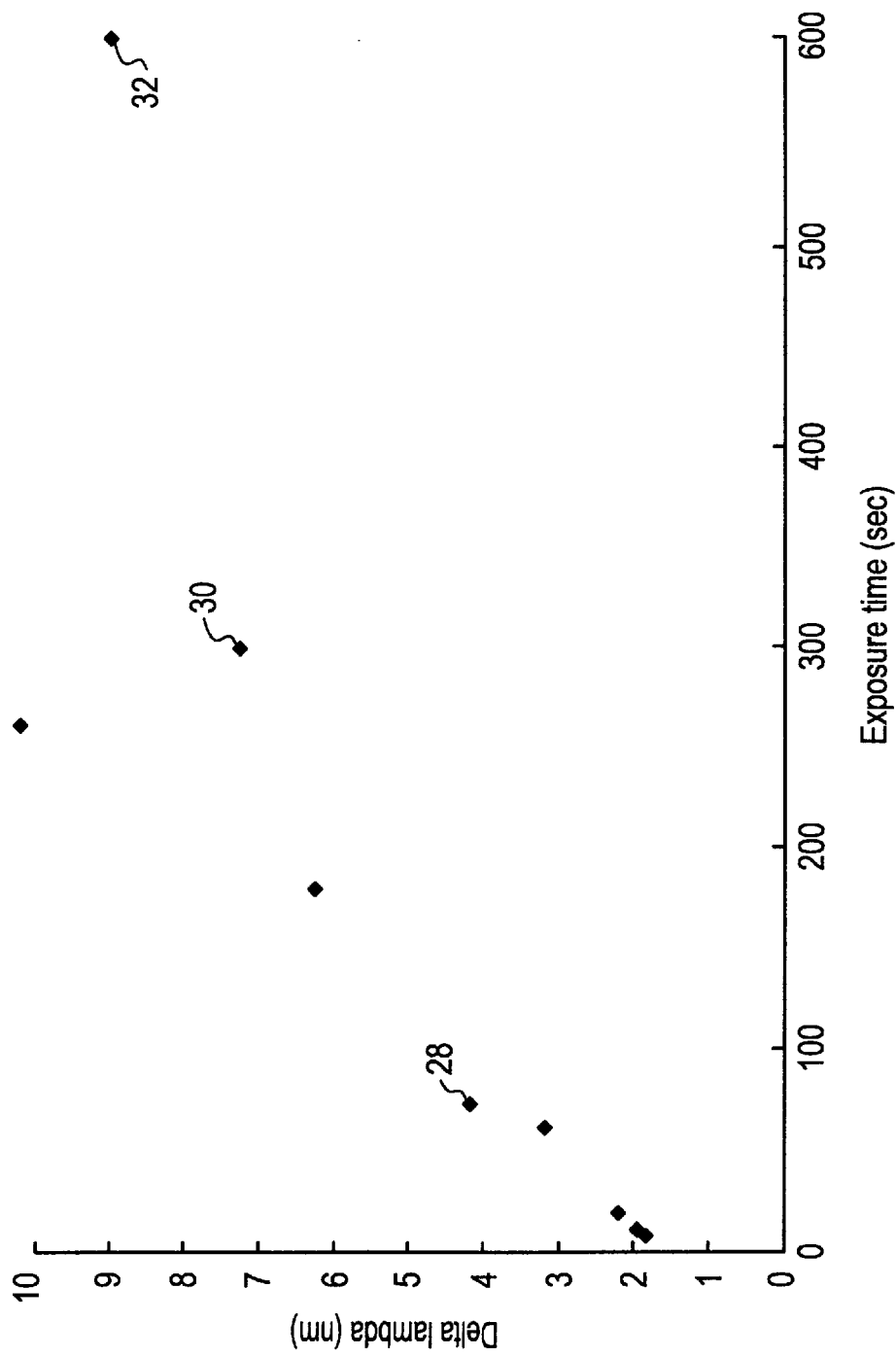

METHOD OF TUNING AN OPTICAL DEVICE

This application is based upon the provisional application Ser. No. 60/079,760, filed Mar. 27, 1998, which we claim as the priority date of this application.

BACKGROUND OF THE INVENTION

The invention is directed to a method of tuning an optical interference device comprising a plurality of waveguides transmitting co-propagating light waves. The tuning is done by changing the optical path length of at least two of the waveguides. In particular, the optical path length is changed by changing the refractive index of at least a portion of two of the waveguide lengths by illuminating the portions of the waveguide lengths with ultraviolet light. The two irradiated waveguides are designed to have different responses to the ultraviolet light which allows a simultaneous irradiation to produce relatively different changes in optical path length of the at least two waveguides.

As optical waveguide telecommunications has moved into higher capacity applications and those which involve multiplexed signals and signals which must be delivered to different nodes on demand, the requirement for robust and versatile optical components has increased. Many of these components, including wavelength division multiplexers, add/drop filters, and switches, make use of a phase shifting array of waveguides, which in this document is called simply a plurality of waveguides, to establish phase differences between propagating signals. When the phase shifted signals are brought together in a coupling or focusing element of the optical device, interference occurs and the multiplexing, filtering or switching function is achieved.

Because the wavelength of signal light is typically in the range of one or two thousand nanometers, the phase shifting plurality of waveguides must be precisely manufactured. This is especially true in systems having very close channel spacing. The manufacturing tolerances in refractive index profiles and geometrical dimensions of typical waveguides frequently are large enough to introduce unacceptable variation in the multiplexing or filtering function of the device.

Therefore most processes for making such devices include a tuning step in which the spectral response, i.e., the signal strength versus wavelength over a preselected band of wavelengths, is adjusted. Typically the tuning step is carried out as an iterative process in which the optical path lengths of the waveguides making up the plurality are changed in order to change the spectral response of the device. The spectral response is measured and another optical path length change made. The process continues until a target spectral response is achieved.

Tuning processes which involve changing the geometry, for example the length, of members of the plurality of waveguides are cumbersome and time consuming. Also, they pose a definite problem in terms of accuracy and repeatability of tuning.

The same is true for tuning processes which rely upon thermal diffusion of dopants, in the members of the plurality of waveguides, to change the respective optical path lengths thereof. An additional time consuming feature of a thermal method is the need to allow a cool down period before a spectral measurement can be made and the next iteration in the tuning carried out. A thermal method is often plagued by hysteresis effects which at best cost time and which at worst can completely undermine the tuning process.

Thus there is a need in the optical waveguide telecommunications industry for an optical interference device tuning method which is fast, stable and repeatable.

DEFINITIONS

An optical interference device includes at least two waveguides. The power output of the device, over a preselected range of wavelengths, depends upon the relative difference in propagation constants of the at least two waveguides of the interference device.

The optical path length of a waveguide, $L_o=ct$, where c is the speed of light in a vacuum and t is the time required to traverse the length L of the waveguide. Note that if n is the refractive index of the waveguide material and v is velocity of light in the material, then, $L_o=c(L/v)=c(L/[c/n])=nL$.

The spectral response of an optical interference device is the light output power of the device at each of a pre-selected set of light wavelengths.

Coherent or co-propagating light is at least two light beams for which the relative phase relationship is known.

A refractive index profile is the description of the refractive index of a waveguide at each point along a line, or a segment thereof, having a first and a last point, the first point chosen as the geometrical center of the waveguide and the last point chosen along a line within the waveguide which extends from the first point perpendicular to the long axis of the waveguide.

The light carrying region of the waveguide describes a cross section of the waveguide through which the guided light passes. The light carrying region of the waveguide may be chosen as that cross section through which a percentage of the light energy or power passes. The percentage is typically chosen to be no less than 60%. A choice in the range of 80% to 90% of the total transmitted light energy is not uncommon.

SUMMARY OF THE INVENTION

The present invention meets the need for a method of tuning optical interference devices, i.e., those which operate by controlling the interference of beams of light, which is fast, easily controlled, and highly predictable and reproducible.

The method comprises the steps of forming an optical interference device which includes a plurality of waveguides having optical paths of different optical length. The difference in optical length can be achieved by providing waveguides having different respective physical length, different respective refractive index profile, or different refractive index altering materials forming the refractive index profile.

Light is launched into one of the fibers, and a selected fraction of the light is coupled into the other fiber(s) in one coupling region. The different propagation constants of the fibers produces a relative phase difference to occur for light signals propagating in the fiber(s). This configuration leads to interference after the signals are rejoined in the next coupling region. The light power in the different fibers is in phase after the first coupler. The light power propagated by each of the fibers need not be evenly divided. An alternative statement is, the plurality of waveguides have different respective optical path lengths, the light in each of the waveguides is phase shifted relative to the phase of the light in every other of the plurality of waveguides. The beams of light from the plurality of waveguides thus interfere, when recombined after phase shifting, to produce a spectral response, i.e., a distribution of light intensity over a band of wavelengths.

The manufacturing tolerances on waveguide geometry and refractive index profile are enough to produce an unacceptable variation in spectral response of the optical device. Therefore, the spectral response of the optical device is measured and adjustments in optical path length are made to produce a spectral response which is sufficiently close, i.e., within a preselected tolerance, to a target spectral response. The adjustments in path length are made quickly, reproducibly and predictably by irradiating with ultraviolet (UV) light at least a portion of two or more of the plurality of waveguides. The UV light alters the spectral response by altering the refractive index profile of the irradiated waveguide portion. The irradiated waveguides are manufactured to have different reponses to the UV light. That is, the UV induced change in refractive index of the two waveguides is different even if the UV exposure time and intensity of the waveguides is identical. Because the inter-waveguide spacing in typical components is small, simultaneous irradiation often is the only practical tuning alternative.

After irradiation, the spectral response of the device is again measured and the UV irradiation process repeated if necessary. By iteratively measuring and irradiating the at least a portion of the two or more waveguides, the spectral response of an optical interference device can be made to fit a target spectral response to within a preselected target. When tuning is complete, the tuned device may be stabilized by using a heat treating, i.e., annealing step. A typical annealing cycle includes the steps of bringing the device to a temperature in the range of about 90° C to 200° C and holding the device at that temperature for a time in the range of 1 hours to 100 hours. In some cases the device may be coated with a polymer material. In such cases the upper limit of annealing temperature is set by the temperature the polymer can withstand. For typical polymer coatings the upper limit of temperature is about 125° C. In the absence of a polymer coating the upper limit of temperature is determined by the temperature which will reverse the tuning process. For many device compositions this temperature is about 500° C. Annealing time and temperature are related, the higher temperature allowing a shortening of the annealing time. We contemplate for certain devices annealing temperatures in the range of about 90° C to 500° C and times in the range of about 0.1 hours to 100 hours. Annealing effectively preserves the spectral response of the device over time in the use environments common for such devices.

In a first embodiment of the method, each of the plurality of waveguides of the device are manufactured to have different, i.e., unique, refractive index profiles. The difference in index profile is due to differences in weight percent distribution of one or more index altering dopants. The dopants used are identical but the shape of the respective profiles of the plurality of waveguides is different. This difference in profile shape causes identical UV radiation exposures to produce different changes in optical path length of the respective waveguides.

In another embodiment, the profile shape of the respective waveguides of the plurality is the same but the index aftering materials of the waveguide, specifically, those materials which raise or lower refractive index in a waveguide, are different. A typical glass waveguide is made of no less than 70 % silica which is doped with index increasing substances such as germania or index lowering substances such as boron.

The respective profiles of the plurality of waveguides will be affected differently by identical UV exposures because different dopants are affected differently by the UV. For example, boron is known to be much more sensitive to UV radiation than is germanium. An optical path length of a waveguide containing a higher weight percent boron in the light carrying region will be changed more than that of a waveguide containing less boron in the light carrying region.

This difference in susceptibility of different waveguide compositions to UV allows one to use a single UV source to simultaneously tune the plurality of waveguides which comprise the optical interference device.

In yet another embodiment of the method, combinations of profile shape and different amounts and types of index altering dopants are used in the respective waveguides of the plurality to achieve different optical path lengths and a particular response of the respective waveguides to UV tuning. For example, the plurality could be divided into two groups, a first group having respective UV response differences due to index profile shape differences, and a second group having respective UV response differences due to identical index profiles having differences in composition, such as the distribution of weight percent boron which is co-doped with germanium along the profile.

It will be understood that the scope of the invention includes other combinations of profile shape and composition. For example, both profile shape and boron distribution differences could be used in each of the plurality of waveguides in an optical interference device. The mix of profiles shapes and compositions is determined by the desired response of the plurality of waveguides to UV radiation. Stated differently, one can preselect the UV induced shift in spectral response of a plurality of waveguides by proper choice of waveguide index profile and composition.

Embodiments of the method are contemplated in which each one of the plurality of waveguides is treated separately with UV light. The spectral response is tuned by control of UV exposure time and intensity directed to each waveguide separately. It is expected that such flexibility in tuning would result in much closer tuning of the actual to target spectral response.

However for integrated devices and even for compact fiber devices, spatial limitations are expected to require tuning in which the plurality of waveguides receive simultaneous UV exposure.

Many useful optical interference devices may be constructed in which the plurality of waveguides is two. In such devices the design and tuning are much more readily done given the greatly reduced number of variables. A class of devices which require only two waveguides in the relative phase changing part of the device are the lattice filters or lattice form optical circuits. See for example, "Synthesis of Coherent Two Port Lattice Form Optical Delay Line Circuit", Jinguji, et al., Journal of Lightwave Technology, V. 13, No. 1, Jan. 1995, page 73. In FIG. 2 of the reference, the circuits are seen to made up of delay lines, directional couples, and phase changing or phase shifting sub-units. The phase shifting sub-units are the plurality of waveguides disclosed and described in this document.

The lattice form circuits may be tuned using the novel method set forth herein. A number of devices can be made using lattice form circuits, such as linear Chebyshev filters, Fourier filters, multichannel selectors and group delay dispersion equalizers.

A particularly simple but very useful lattice filter is the Mach-Zehnder filter or interferometer which comprises an input coupler, a phase changing pair of waveguides, and an output coupler. The novel method described herein is exceptionally useful in tuning this filter type.

BRIEF DESCRIPTION OF THE DRAWINGS

FIG. 3 is a chart of the shift in spectral response of an optical interference device irradiated with UV light.

FIG. 4 is a point chart showing the change in central wavelength versus UV exposure time of a Mach-Zehnder device.

DETAILED DESCRIPTION OF THE INVENTION

The novel method of tuning optical interference devices has three principle advantages over other tuning techniques such as thermal diffusion. The UV tuning method may be done quickly because the exposure time is typically short. Also there is no dead time waiting for the tuned device to cool or stabilize prior to making a measurement. The UV can be delivered accurately in terms of amount of energy delivered and the location at which the energy is delivered. Also, the process is reproducible and repeatable in that the intensity and shape of the UV beam may be held constant or changed in a predictable way as tuning operations are carried out on different devices or on parts of the same device.

In fact, the accuracy of the method is such that the inventors contemplate that, as a data base of the effect of UV on optical device spectral response grows, it will become possible to predict the proper tuning parameters and so eliminate the need for measurement of the spectral response after tuning.

Furthermore, the technology of generating and shaping UV pulses or continuous beams is mature. It is thus contemplated that manufacturing advantages will be realized such as, simultaneous irradiation of several devices, or active monitoring of spectral response during single or repeated exposures of a device to UV.

Figure 1:
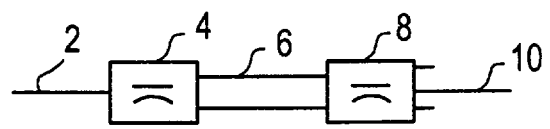
FIG. 1 is a schematic diagram of an optical interference device.

A block diagram of an optical interference device is illustrated in FIG. 1. An input waveguide 2 transmits light to coupler 4 which in turn couples the light into the plurality of waveguides 6. A relative phase change of light traveling in different members of the plurality occurs. The phase shifted or phase changed light rays then are transmitted to coupler 8 which delivers the light to an output waveguide 10. Interference of the phase shifted light rays results in a difference in intensity of light in waveguide 10 depending upon the light wavelength. That is, a filtering of a light signal based upon wavelength has occurred. Other configurations of input and output waveguides, together with alternative coupler types and placements, produce different optical device performance as noted above.

Whatever the device configuration, tuning is carried out by irradiating at least a portion of two or more of the plurality of waveguides 6. The at least two waveguides have a different response to the UV irradiation due to differences in waveguide index profile shape, dopant type or concentration, or all of the preceding.

Figure 2:
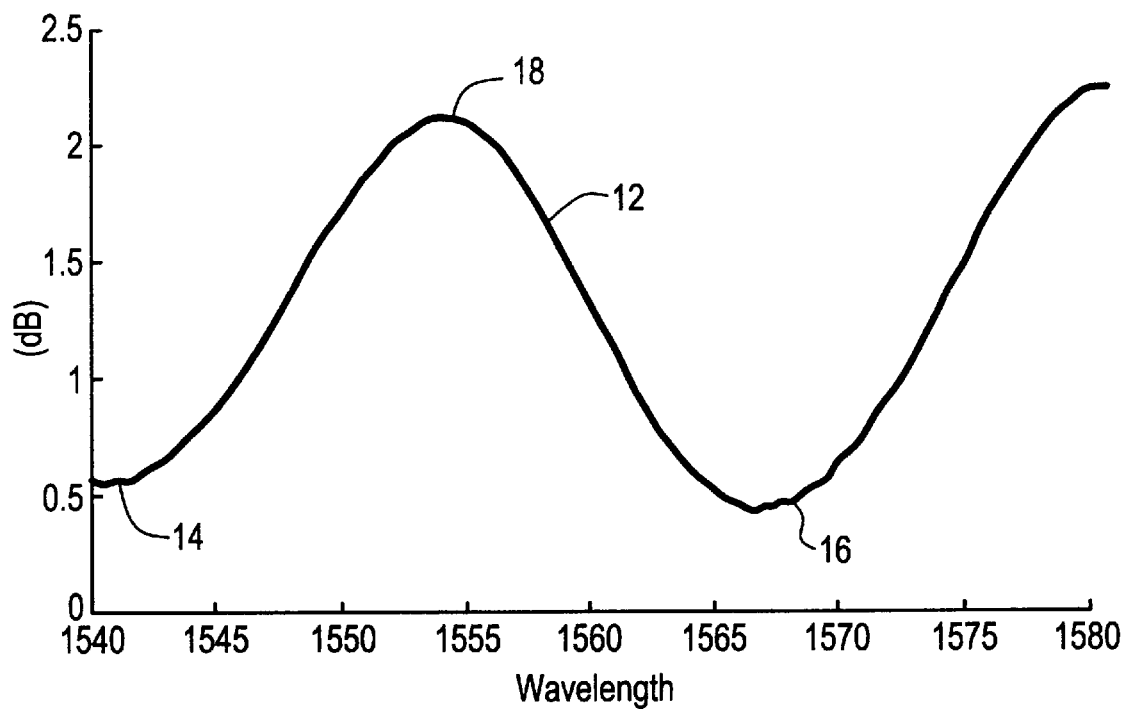
FIG. 2 is a chart of spectral response of Mach-Zehnder Filter Interferometer.

A typical spectral response of a Mach-Zehnder interferometer is shown in FIG. 2. Curve 12 shows the relative signal attenuation as a function of light wavelength. Note that this optical interference device configuration is designed to pass light signal wavelengths near point 14 at 1540 nm and point 16 at 1567 nm. A light signal near point 18 at 1553 nm is attenuated or filtered.

EXAMPLE - EFFECT OF UV RADIATION ON A MACH-ZEHNDER INTERFEROMETER

The optical interference device known in the art as a Mach-Zehnder interferometer was irradiated using an excimer laser operating on the 248 nm, KrF line. The laser was a model 205i made by Lambda-Physik. Peak light intensity in the plane containing the waveguides 6 of FIG. 1 was about 150 mJ/cm$^2$ for a pulse having a time duration of about 25 ns. The pulse repetition rate was initially set at 15 Hz. Further experimentation showed satisfactory shifting of the spectral response at pulse repetition rates in the range of 1 Hz to 15 Hz. The length of waveguide exposed to the pulsed UV radiation was about 4 mm.

FIG. 3 shows the original, pre-radiation, spectral curve 20. After 1 minute of exposure of the waveguides 6 to the pulsed UV laser, the points 14, 16, and 18 were caused to shift as illustrated by curve 22 of FIG. 3. The spectral response was further shifted to higher wavelengths after an exposure to the pulsed laser of 3 minutes, 5 minutes, and 10 minutes as is shown by curves 22, 24, and 26 respectively.

Note that the spectral shift per unit time of exposure is not linear. FIG. 4 shows the shift in wavelength of a point on the original curve as exposure time increased. Point 28 on the chart of FIG. 4 shows a change of about 4.2 nm after about 1 minute of exposure to the pulsed excimer laser. After 5 minutes of exposure, point 30, the wavelength shift reached about 7.3 nm, less than double the shift for a 5× increase in exposure time. At 10 minutes exposure, point 32, the spectral shift was about 9.3 nm. The overall curve showed a marked flattening for exposure times in the range of 10 minutes and longer. After tuning the device was stabilized, using an annealing cycle at a temperature of about 100° C for about 10 hours.

The novel method of tuning an optical interference device has been illustrated using the simplest of devices. However, the inventors contemplate tuning more complicated devices using essentially the same irradiation scheme as set forth in the example above. For example a plurality of waveguides in a planar integrated package is readily tuned using the method set forth herein. This is especially true due to the optics available for homogenizing the UV pulse over an extended area. Using the excimer laser described above, which emits a rectangular shaped beam, uniform irradiation over lengths of 26 mm was achieved. This performance is expected to offer significant manufacturing cost reduction due to simultaneous irradiation of several devices.

Figure 5:
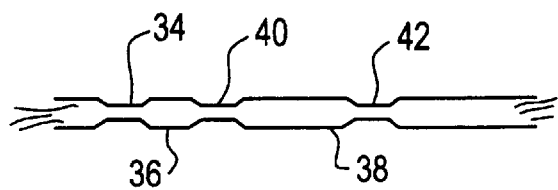
FIG. 5 is a schematic drawing of a more complex device incorporating three coupling regions and two phase shifting regions.

An example of a more complex device which can be tuned using the novel technique herein is shown in FIG. 5. In this example, three coupling regions 34, 40 and 42 are separated by two phase shifting regions 36 and 38. Each of the phase shifting regions may be tuned separately, affording a wide degree of flexibility in tuning the performance of the device.

To tune more sophisticated filters such as Fourier or Chebyshev filters, the glass dopant levels or index profiles of the plurality of waveguides could be preselected and arranged in a bundle. The tuning could then be done using simultaneous irradiation of the waveguide plurality using essentially the same apparatus as set forth above.

Although particular embodiments of the invention have been disclosed and described hereinabove, the invention is nonetheless limited only by the following claims.

We claim:

1. A method of tuning an optical interference device comprising the steps:

a) forming an optical interference device including a plurality of waveguides which co-propagate light, each of the waveguides having a first and a second end, a refractive index profile, a light carrying region, and respective optical path lengths;

b) launching co-propagating light into the first ends of each of the plurality of waveguides, the light having a phase and the phase being known at each of the first ends of the plurality of waveguides, a relative phase shift occurring in the light traveling through the plurality of waveguides to produce a spectral response in the light emerging from the respective second ends of the plurality of waveguides;

c) measuring the emerging light spectral response over a preselected band of wavelengths;

d) comparing the measured spectral response of step c) to a target spectral response;

e) irradiating with ultraviolet light, for a preselected time interval and at a preselected intensity, at least a portion of at least two of the plurality of optical waveguides to change the optical path length of the waveguide portion and so change the spectral response of light emerging from the plurality of waveguides, the at least two waveguides each having a different response to the ultraviolet light; and, f) repeating steps b) though e) until the measured spectral response is, within a preselected tolerance, equal to the target spectral response.

2. The tuning method of claim 1 further including after step f) the step of annealing the optical device at a temperature in the range of 90° C to 200° C for a time in the range of 1 hour to 100 hours.

3. The tuning method of claim 1 further including after step f) the step of annealing the optical device at a temperature in the range of 90° C to 500° C for a time in the range of 0.1 hours to 100 hours.

4. The tuning method of claim 1 in which each of the respective refractive index profiles of the plurality of waveguides is different so that respective induced change in optical path lengths of the plurality of waveguides, due to identical exposures to ultraviolet light, as recited in step e) of claim 1, of each of the plurality of waveguides, is different.

5. The tuning method of claim 4 in which at least a portion of the respective light carrying regions of the plurality of wavelengths contain boron.

6. The tuning method of claim 1 in which at least a portion of the respective light carrying regions of the plurality of waveguides contain boron.

7. The tuning method of claim 6 in which the respective refractive index profiles of the plurality of waveguides are identical and the boron has a distribution along the index profile expressed as a weight percent, the weight percent distribution of the boron along the respective refractive index profiles of the plurality of waveguides being different.

8. The tuning method of claim 1 in which the plurality of waveguides is divided into a first and a second group, the sum of the waveguides of the first and second group being equal to the plurality, the first group containing waveguides having different refractive index profiles, and the second group having identical refractive index profiles, at least a portion of each refractive index profile containing boron, the boron having a distribution along the index profile expressed as a weight percent, and the weight percent distribution of the boron along the respective refractive index profiles of the plurality of waveguides being different.

9. The tuning method of any one of claims 2, 3, 4, 5, 6,7 or 8 in which the plurality of waveguides each receive identical exposure to ultraviolet light as recited in step e).

10. The tuning method of claim 9 in which the plurality of waveguides is simultaneously exposed to ultraviolet light.

11. The method of any one of claims 1, 2, 3, 4, 5, 6, 7 or 8 in which the optical interference device comprises two waveguides.

12. The method of claim 11 in which the optical interference device is a lattice filter.

13. The method of claim 12 in which the optical interference device is a Mach-Zehnder interferometer.

* * * * *